United States Patent
Schoula et al.

(10) Patent No.: US 10,252,699 B2
(45) Date of Patent: Apr. 9, 2019

(54) METHOD FOR OPERATING A PASSIVE RADIO-BASED LOCKING DEVICE AND PASSIVE RADIO-BASED LOCKING DEVICE WITH A MOBILE DEVICE AS A TRANSPORTATION VEHICLE KEY

(71) Applicant: VOLKSWAGEN AG, Wolfsburg (DE)

(72) Inventors: Ralf Schoula, Usingen (DE); Claus-Peter Brückner, Braunschweig (DE)

(73) Assignee: VOLKSWAGEN AG (DE)

( * ) Notice: Subject to any disclaimer, the term of this patent is extended or adjusted under 35 U.S.C. 154(b) by 0 days.

(21) Appl. No.: 16/011,850

(22) Filed: Jun. 19, 2018

(65) Prior Publication Data
US 2018/0370488 A1 Dec. 27, 2018

(30) Foreign Application Priority Data
Jun. 22, 2017 (DE) .................. 10 2017 210 523

(51) Int. Cl.
*H04B 1/38* (2015.01)
*G06Q 10/00* (2012.01)
(Continued)

(52) U.S. Cl.
CPC ............ *B60R 25/241* (2013.01); *B60R 25/01* (2013.01); *G07C 9/00023* (2013.01);
(Continued)

(58) Field of Classification Search
CPC ....... B60R 25/241; B60R 25/01; B60R 25/24; B60R 25/33; B60R 16/02; B60R 16/037;
(Continued)

(56) References Cited

U.S. PATENT DOCUMENTS 9,020,441 B2    4/2015 Koga et al.
2013/0332007 A1*  12/2013 Louboutin ............ H04W 4/021
701/2
(Continued)

FOREIGN PATENT DOCUMENTS

DE    102012220263 A1    5/2013
DE    102012016251 A1    2/2014
(Continued)

OTHER PUBLICATIONS

Search Report for German Patent Application No. 10 2017 210 523.2; dated Dec. 13, 2017.
(Continued)

*Primary Examiner* — Yong Hang Jiang
(74) *Attorney, Agent, or Firm* — Barnes & Thornburg LLP

(57) ABSTRACT

A method for operating a passive radio-based locking apparatus of a transportation vehicle wherein the locking apparatus enables at least one access function of the transportation vehicle, wherein the passive radio-based locking apparatus includes a mobile device embodied as a radio key unit and a transceiver at the transportation vehicle, between which at least two electromagnetic radio signals are exchanged for the electromagnetic radio connection, and for the operation, one parameter of each of the radio connections of the passive radio-based locking apparatus is modified. Prior to enabling the access function, an identification feature of at least two data communication interfaces for setting up communication for the radio connections at the radio key unit and/or at the transceiver is modified and also each is set to a latest value, and the access function is enabled only in response to the relevant identification feature having the latest value.

16 Claims, 1 Drawing Sheet

(51) Int. Cl.
*G06F 17/00* (2006.01)
*B60R 25/24* (2013.01)
*G07C 9/00* (2006.01)
*B60R 25/01* (2013.01)

(52) U.S. Cl.
CPC ...... *G07C 9/00111* (2013.01); *G07C 9/00896* (2013.01); *G07C 2009/00349* (2013.01); *G07C 2009/00412* (2013.01); *G07C 2009/00436* (2013.01); *G07C 2009/00769* (2013.01)

(58) Field of Classification Search
CPC ...... B60R 2021/0027; B60R 2325/101; B60R 2325/205; B60R 25/045; B60R 25/209; G07C 9/00023; G07C 9/00111; G07C 9/00896; G07C 2009/00793; G07C 9/00309; G07C 2209/63; G07C 2009/00206; G07C 2009/00547; G07C 2009/00769; G07C 2009/00825; G07C 2209/08; G07C 9/00; G07C 9/00571; G07C 2009/00555; G07C 9/00007; G07C 9/00174; G07C 9/00182; H04W 4/80; H04W 4/02; H04W 4/021; H04W 4/022; H04W 4/04; H04W 4/046; H04W 64/003; H04W 12/04; H04W 12/08; H04W 24/00

USPC .................................. 340/5.1, 5.2, 5.7, 5.72
See application file for complete search history.

(56) References Cited

U.S. PATENT DOCUMENTS

2014/0040621 A1    2/2014  Klimke
2015/0029010 A1*   1/2015  Wisnia ................... G08C 17/02
                                                  340/426.17

FOREIGN PATENT DOCUMENTS

| DE | 102013222332 A1 | 5/2014 | |
| DE | 102016002302 A1 | 9/2016 | |
| DE | 102015214336 A1 | 2/2017 | |
| EP | 2193607 A1 | 6/2010 | |
| JP | 2012052361 A | 3/2012 | |
| WO | 2012017214 A1 | 2/2012 | |
| WO | 2015013087 A1 | 1/2015 | |
| WO | WO-2015183949 A1 * | 12/2015 | ............ E05B 39/005 |

OTHER PUBLICATIONS

Search Report for European Patent Application No. 18173482.3; dated Nov. 6, 2018.

* cited by examiner

METHOD FOR OPERATING A PASSIVE RADIO-BASED LOCKING DEVICE AND PASSIVE RADIO-BASED LOCKING DEVICE WITH A MOBILE DEVICE AS A TRANSPORTATION VEHICLE KEY

PRIORITY CLAIM

This patent application claims priority to German Patent Application No. 10 2017 210 523.2, filed 22 Jun. 2017, the disclosure of which is incorporated herein by reference in its entirety.

SUMMARY

Illustrative embodiments relate to a method for operating a passive radio-based locking apparatus of a transportation vehicle which provides protection against unauthorized extension of the signal range.

BRIEF DESCRIPTION OF THE DRAWINGS

An exemplary embodiment is described below, with regard to which.

DETAILED DESCRIPTION

Figure 1:
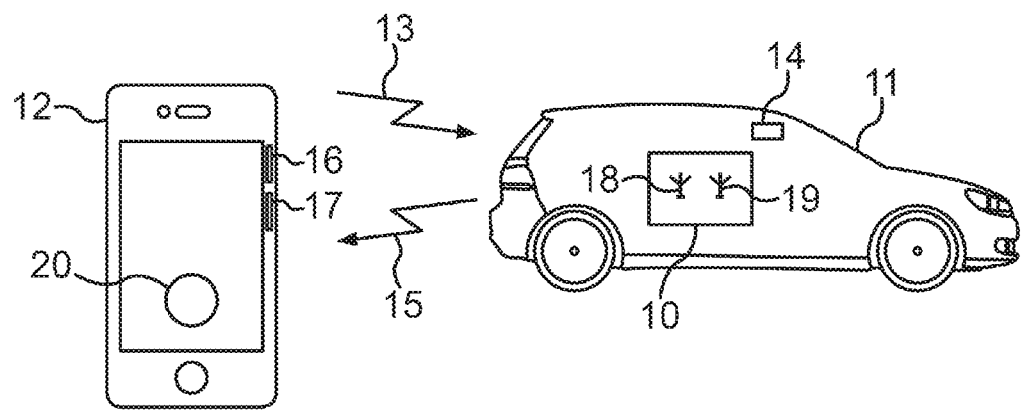
FIG. 1 shows a schematic diagram of a transportation vehicle comprising a locking apparatus and shows a mobile device.

Passive radio-based locking apparatuses give a user of a transportation vehicle the opportunity and the benefit of providing or enabling access functions of the transportation vehicle, for instance, a door-locking mechanism or a start function of the transportation vehicle even without inserting a key into an ignition lock. They offer the benefit that a user can be provided with access functions even without pressing a button or similar interaction on a radio key of the locking apparatus. A downside of radio-based locking apparatuses, however, is that they may be vulnerable to unauthorized third-parties also being able to use the access functions of the transportation vehicle by extending the range of a radio signal of the passive radio-based locking apparatus or by a radio signal generated without authorization for controlling the radio-based locking apparatus.

Document EP 2 193 607 B1 provides a method for protecting against extending the range of a radio signal of a radio-based locking apparatus, which radio signal may be a BLUETOOTH® signal, in which method a frequency of a signal can be changed in very short time intervals according to a predefined pattern, the change being referred to as frequency-hopping. The pattern can be agreed between transmitter and receiver of a connection when the connection is set up. In the event that a third-party, for instance, to extend the range of the radio signal, has found a present frequency and could extend the range, the frequency of the signal has already changed again, which means that the third-party must first find the new frequency, and therefore tracking of the particular frequency would lie after the currently prevailing frequency, whereby it is possible to prevent successful unauthorized range-extension.

U.S. Pat. No. 9,020,441 B2 describes how operating a radio-based locking apparatus is prevented when a signal transit time from a radio key to a transportation vehicle and back to the radio key is longer than is needed for a corresponding distance of a radio key from a transportation vehicle in a normal operating state. It is likely in this case that the radio signal range has been extended without authorization by range-extension. For a signal transmission, a wideband signal as the transmission signal is divided into a multiplicity of narrowband transmission signals, and the narrowband transmission signals are then each transmitted. In this process, a radio key can make a modification to a received transmission signal, and send the modified signal back to a transportation vehicle, wherein the locking apparatus is protected by the fact that when a signal hacker sends back to the transportation vehicle a signal without this modification, it is detected that someone is trying to interfere with a radio connection of the locking apparatus without authorization. In this context, a radio signal can have a specific waveform that can be varied over time. In addition, a frequency spectrum or intervals between individual narrowband signals can be modified.

DE 10 2013 222 332 B4 discloses a system and a method for transportation vehicle functions activated by a mobile apparatus. The mobile apparatus may in this case be a mobile phone or smartphone. Radio communication between a transportation vehicle and the mobile apparatus can take place using a predefined communications protocol, for instance, BLUETOOTH® or Wi-Fi. The downside is that no protection is provided against third-parties using signal hacking for unauthorized operation.

DE 10 2012 016 251 A1 discloses a method and system for remote-controlled activation of at least one apparatus for unlocking or locking at least one door of a transportation vehicle. This is achieved by transmitting between an operating device and the transportation vehicle a first signal and an additional signal in addition to the first signal, wherein the additional signal is used to perform a plausibility check on the first signal. The apparatus for unlocking or locking is activated only if the plausibility check is passed. The additional signal can be used, for example, to supplement or add to encoded information in the first signal. A plausibility check may then also be passed if a transit-time difference lies in a predefined range. The additional radio signal may be a radio signal in a different frequency range from the first radio signal or may even be an ultrasound signal.

DE 10 2012 220 263 A1 comprises a method a transmitting a challenge by a base station to a transponder via a first communication link, and an establishing a second communication link to the transponder. The second communication link is a capacitive connection. The method also comprises receiving a first response to the challenge via the first communication link to the transponder, scanning the second communication link to detect a signal that corresponds to a second response from the transponder to the challenge, receiving the second response via the second communication link, and authorizing the transponder on the basis of the first response and on the basis of the second response.

DE 10 2016 002 302 A1 relates to a locking system, in particular, as a keyless Entry/Go functionality for access authorization and/or driving authorization for a transportation vehicle, having a first device, which has at least two states and is designed as a control device, for instance, a control device for unlocking and/or locking the car doors, the ignition lock, the steering-wheel lock, for enabling and/or disabling the immobilizer, the engine control module, and having an associated second device, as an electronic key, an ID-transmitter, a smartcard or the like. For their intended operation, both devices possess first transceivers for transmission of electromagnetic signals. At least one of the signals transmitted between the second device and the first device is an encoded operating signal for authenticating the second device, so that after positive evaluation of the transmitted operating signal, given that the second device is authorized, it is possible to make a change to the state of the first device. A second transceiver, which works at low power and is operated in polling mode, is provided in the first device. A transponder, in particular, a transponder that works passively, optionally an RFID tag, is provided in the second device. The intended operation of the first transceiver is started in the manner of a wake-up only when a prior positive authentication is made between the transponder and the second transceiver.

If a mobile device, i.e., a mobile phone or a smartphone, is used as the radio key unit of a locking apparatus, it is a drawback to use an ultrasound signal for a plausibility check, because such a signal cannot be generated by a commercially available mobile device. In addition, owing to limited functions of a transceiver, i.e., a unit that transmits and receives electromagnetic radio signals, of a commercially available mobile device, a mobile device can only make frequency changes in limited ranges.

Disclosed embodiments use existing functions of a commercially available mobile device, which is being used as a radio key unit of a radio-based locking apparatus, to ensure secure operation of the locking apparatus, i.e., to provide protection against unauthorized extension of the signal range.

Disclosed embodiments provide a method that allows secure operation of a passive radio-based locking apparatus of a transportation vehicle. Secure operation means operation that is protected against unauthorized extension of the signal range or unauthorized signal generation by third-parties, which may be range extenders or signal hackers. An access function of the transportation vehicle can be enabled by the passive radio-based locking apparatus by at least two electromagnetic radio connections that are made successively between two components of the locking apparatus, namely between a radio key unit and the transportation vehicle or a locking mechanism of the transportation vehicle, which locking mechanism is formed by the locking apparatus. An access function may also be another transportation vehicle function besides locking or immobilization, for instance, locking a glove compartment or a luggage compartment. The method can also protect other transportation vehicle functions against unauthorized access. Moreover, the radio key unit is a mobile device, for instance, a mobile phone or smartphone. In this case, the radio key unit can be controlled using an app, i.e., software for a mobile phone, that has been specifically developed for the purpose. For the electromagnetic radio connections, one of the components of the locking apparatus, so either the radio key unit or a transceiver as the locking apparatus at the transportation vehicle, transmits for each radio connection at a time at least one electromagnetic radio signal to the corresponding other component. In this process, one parameter of the radio connection of the locking apparatus is modified for each transmission of the radio signal, wherein the particular radio signal comprises the relevant parameter. The parameter is modified in a manner that is known only to the components of the passive radio-based locking apparatus but not to an unauthorized third-party.

According to the disclosure, at least one identification feature of at least two different data communication interfaces is modified as the modified or modifiable parameter. Thus a locking operation involves at least two radio connections, which run, are made via at least two, optionally a plurality of, radio connections. The modification is made prior to enabling an associated access function of the transportation vehicle. Thus it can also be made already before a locking operation and before a radio connection corresponding to the locking operation. An identification feature of one of the data communication interfaces is a feature that is used respectively by one of the components to identify itself to the other component of the locking apparatus. A data communication interface is a radio interface provided at one component and which is used to set up a radio connection between the components of the locking apparatus. A data communication interface can satisfy a predefined radio standard. Each modification to the identification feature sets this identification feature to a latest value. The access function of the transportation vehicle is enabled only if the relevant identification feature has the latest value at that time. This means that if a modification is made at some point before the radio connection, for example, at least the corresponding latest value must be present. It may be provided that in a plurality of radio connections containing a plurality of radio signals, i.e., in particular, more than two radio connections, of a locking operation, the identification feature is modified a plurality of times. In this case, the identification feature of each of the plurality of radio connections must each have the latest value corresponding to the radio connection concerned. A plurality of different data communication interfaces may be employed for this purpose, which are used successively and/or simultaneously.

This means, for example, that the radio key unit modifies its present identification feature before each transmission of an electromagnetic radio signal to the transportation vehicle. The transportation vehicle knows a currently latest value of the identification feature of a radio connection, for instance, by this identification feature being modified on the basis of a predefined table. In a first radio connection, the identification feature can have a first value, for example, which equals a first value of the table or generally a value stored in the predefined table, and a corresponding access function of the transportation vehicle can thereby be enabled. In a second radio connection, the identification feature is modified to a second value, which is known to the transportation vehicle, e.g., via a second value of the predefined table, so that for the second connection the transportation vehicle enables the corresponding access function only when a corresponding radio signal exhibits the identification feature having the second value. A present identification feature can also be made known to the relevant data communication interface by a transportation vehicle communication network, for instance, a CAN network or a LIN network, wherein an on-board computer connected to the transportation vehicle communication network can comprise the predefined table, or agree or define the present identification feature of a radio connection in an additional preceding encrypted radio connection to one of the components. It is also possible to use a control unit other than an on-board computer, e.g., to use a control module of the transportation vehicle.

The resultant benefit is that even when a signal hacker receives a radio signal in a first radio connection, it cannot extend the range of, or generate, a radio signal to enable an access function of the transportation vehicle because it would attempt to extend the range of, or generate, a second radio signal having the first identification feature, which it detected from the first radio connection. In this case, however, an access function of the transportation vehicle is not enabled, or a signal having the first identification feature is no longer available for range-extending. There is only a very low probability of being able to extend the range of the second radio signal, because a range extender for extending the range of a radio signal is seeking a radio signal having a first identification feature, which only at most is known to the range extender. So the range extender can even be diverted from the relevant radio signal. Thus if the identification feature is modified for each radio connection of the locking apparatus, a range extender does not know which radio signal it must extend in range to enable an access function of the transportation vehicle, or looks for a radio signal that does not exist at all. This is beneficial when a multiplicity of radio signals are present around the transportation vehicle, which is the case when a plurality of transportation vehicles and a plurality of mobile devices are present in the region of the transportation vehicle. Thus changing each time the identification feature provides greater security against manipulation of the locking apparatus.

Disclosed embodiments also include developments of the method, which result in additional benefits.

In a development, a WLAN interface and/or a BLUETOOTH® interface of the mobile device and of the transportation vehicle are used in each case as the data communication interface. The benefit thereof is that existing data communication interfaces of the mobile device and also of the transportation vehicle are thereby used, because commercially available mobile devices and most transportation vehicles have both a WLAN interface and a BLUETOOTH® interface. Thus the method is applied to transportation vehicles that at least have one of the two interfaces mentioned. Both the WLAN interface and the BLUETOOTH® interface may be used in one locking operation by a total of at least two radio connections, and for each data communication interface, the identification feature is modified once at least before each locking operation. An access function of the transportation vehicle is thus performed only when both the identification feature of a WLAN connection and the identification feature of a BLUETOOTH® connection each have the latest value in the locking operation. The benefit thereof is that a range extender firstly has the problem of having to extend the range of two different types of an electromagnetic signal, namely a WLAN signal and a BLUETOOTH® signal, and secondly has the problem that, owing to the fact that it does not know the latest identification feature, for both electromagnetic signals it does not know which of the signals from an environment of the locking apparatus containing a multiplicity of such electromagnetic radio signals it must extend in range. Since a WLAN signal and/or BLUETOOTH® signal is used, a multiplicity of such signals can be expected in a typical environment such as a town or a car park, because a multiplicity of mobile devices set up corresponding radio connections in such environments. In addition, two or more different WLAN interfaces can be used, which may each use a different WLAN standard.

According to a development, the different data communication interfaces are used successively in a predefined sequence. Thus in one locking operation, a plurality of different radio connections are used successively, wherein the sequence is not known to an unauthorized third-party. Thus, for instance, when there are three data communication interfaces a), b) and c) present, a sequence can be selected by alternating and/or repeating individual instances of these data communication interfaces a), b) and c), for instance, a)-c)-c)-b)-a)-b) or another predefined sequence and/or other sequence agreed between the components. Changing the radio standard by changing the data communication interfaces and simultaneously changing the corresponding identification feature makes signal range extending more difficult. In addition, the radio connections via a) and b) can be made successively, and the radio connection via c) can be made simultaneously with a radio connection via a) or b) respectively. This has the benefit that a range extender would have to simultaneously extend the range of radio signals having different radio standards, which is possible only with great difficulty, and thus the security is increased.

In a development, the identification feature is modified for each electromagnetic radio connection at a time. In this case, the radio connections are made at different times in a predefined pattern. For example, it can be provided that two BLUETOOTH® connections are set up, followed by a pause for a predefined time length, e.g., 50 ms, and then two WLAN connections are set up. Equally possible are various other sequences of the radio connections by the respective data communication interfaces in various other chronological orders each having respective predefined time lengths for the radio connections and respective predefined time lengths between the radio connections as pauses. Since the relevant identification feature is modified in each of the radio connections, it is difficult to extend the range of the relevant radio signals. Moreover, each of the radio connections has a different identification feature. For instance, a radio signal having a first identification feature can be transmitted in a first WLAN connection, and a radio signal having a second identification feature can be transmitted in a second radio connection that is offset in time. An access function of the transportation vehicle is enabled only when both the first radio signal having the first identification feature and the second radio signal having the second identification feature are received. Instead of the WLAN connection, a BLUETOOTH® connection can also be used, or both a WLAN connection and a BLUETOOTH® connection can be used. Also more than two radio connections can be used, in which case then for each radio connection a corresponding modification of the identification feature takes place, and for the access function to be enabled, for each of the radio signals, the identification feature must in each case have the currently relevant latest value. It is also provided that one different identification feature can be modified for each data communication interface. The development further increases the security of operation of the apparatus.

According to a development of the method, an IP address and/or a MAC address is used as the particular identification feature in each case. An IP address is an address in computer networks that is based on the Internet Protocol (IP). It is allocated to devices that are connected to the computer network, thereby making the devices identifiable. A MAC address (media access control address, also known as an Ethernet ID, Wi-Fi address or physical address) is a modifiable hardware address of a network adapter, which address also acts as a unique identifier of the device in a computer network. If it is a WLAN connection, a radio connection between the mobile device, which is being used as the radio key unit, and the transportation vehicle can be considered to be a computer network. A mobile device that can be used to control a locking operation of the locking apparatus has as standard at least an IP address and a MAC address, which addresses can be used, and hence can be efficiently re-used also in the locking apparatus. The benefit is that thus existing features of the radio connection can be used as the identification feature. Above all, since normally around the transportation vehicle a multiplicity of other users are using a multiplicity of mobile devices having a multiplicity of radio connections, for instance, WLAN connections or BLUETOOTH® connections, each of which have different IP addresses and MAC addresses, in an ambient signal noise a range extender cannot identify and hence cannot extend in range the relevant radio signal used for the locking operation, because in this signal the IP address or the MAC address is changed for every locking operation by modifying the identification feature, and therefore a repeating pattern among different locking operations cannot be recognized from the ambient signal noise.

According to a development of the method, a modification to the identification feature is made known to the corresponding other component in an encrypted radio signal. The benefit thereof is that an identification feature can in each case be set to any latest value that can be agreed between the components, thereby economizing on a table containing predefined modifications to the identification feature. In this development, the radio signal in each case comprises the modified identification feature in encrypted information, so that even when this radio signal is intercepted, an unauthorized third-party cannot find out the modified identification feature at that time. The radio signal may be, for example, the radio signal of a previous locking operation, so of a locking operation for previous enabling of an access function, or an additional radio signal within a currently active locking operation. For example, a component can first transmit an encrypted radio signal having a first identification feature, which equals the latest value, to the corresponding other component of the locking apparatus, wherein the other component is informed of a subsequent modification to the identification feature, and transmit in a second radio signal having the then relevant latest identification feature a request to enable an access function. Even should a range extender succeed in identifying the first radio signal, it does not know which radio signal it would actually have to extend in range for enabling the access function, because this radio signal has the second identification feature.

According to a development, a transmitter power and/or a transmit frequency of the radio connection is modified as an additional parameter in addition to the modified identification feature. For instance, a first BLUETOOTH® connection having a first transmit power can be set up, and a second BLUETOOTH® connection can be used having a reduced transmit power that is reduced by a predefined value, for instance, by half of the first transmit power. An access function is enabled only when the second radio connection has the predefined second transmit power. It is also possible, for instance, that a first BLUETOOTH® connection is set up at a first BLUETOOTH® frequency, and a second BLUETOOTH® connection at a second BLUETOOTH® frequency. This is possible because the standardized BLUETOOTH® protocol provides different transmit frequencies. An access function of the transportation vehicle is enabled only when a sequence of the radio connections each having predefined transmit frequencies is received by the corresponding received component of the locking apparatus. It is also possible that a receiver sensitivity of one of the components can be changed, for example, by a hardware setting or a software setting.

According to a development, additional radio connections, which are independent of a radio connection for enabling an access function of the transportation vehicle, are set up via at least one data communication interface of the locking apparatus. This means, for instance, that the mobile device transmits a radio signal to a device other than the transportation vehicle, the radio signal being transmitted via the same data communication interface as a radio signal that is transmitted to the transportation vehicle. The benefit thereof is that a potential range extender does not know which of the transmit signals of the mobile device it must extend in range to enable an access function of the transportation vehicle, above all because in each case the identification feature of the mobile device or the radio connection of the mobile device is modified. This increases the security of the locking apparatus. It may also be the case, for instance, that in the transportation vehicle itself are provided a plurality of data communication interfaces of the same type, for example, for BLUETOOTH® interfaces. In this case, the transportation vehicle can transmit a radio signal from the first to the second BLUETOOTH® interface and thereby generate ambient radio signals that do not belong to the radio connection of the locking operation. Especially if an identification feature is modified in each of the independent radio signals, then the number of ambient radio signals present in an environment of the locking apparatus is increased, so that a third-party cannot find out which of the radio signals having which identification feature actually belongs to a radio connection that can enable an access function of the transportation vehicle.

In a development, a particular, data communication interface is used to determine a distance and/or a position of the radio key unit with respect to the transportation vehicle. A receive field-strength measurement and/or a transit-time measurement is used for this purpose. A transit-time measurement determines, for example, how long a radio signal takes from the transportation vehicle to the radio key and back again, from which signal transit-time it is possible to determine a distance between radio key unit and transportation vehicle. The access function is enabled only if the distance lies within a predefined range. If, however, range extension is taking place, a corresponding signal transit-time is longer and thus a determined distance is no longer within the predefined range, and therefore an access function is not enabled. The benefit of this development is that in addition to the security feature of the used identification feature of a radio connection, a test is performed to check whether the radio key unit is actually located within a predefined distance from the transportation vehicle or whether range extension is taking place.

Disclosed embodiments also include a passive radio-based locking apparatus of a transportation vehicle having at least two radio interfaces. The radio interfaces are designed to be able to set up at least two electromagnetic radio connections to a mobile device, which mobile device is used as a radio key unit. A radio interface may be a WLAN interface or a BLUETOOTH® interface. The relevant mobile device likewise has corresponding radio interfaces of this type and is designed to enable at least one access function of a transportation vehicle containing the locking apparatus in a locking operation. The passive locking apparatus is thus designed to modify for each radio connection a transportation vehicle-related identification feature of the radio connection, wherein the identification feature may be an IP address or a MAC address, for example, which is set to a latest value. The locking apparatus is also designed to know, for instance, by an encrypted radio signal of the mobile device, latest values of an identification feature of the mobile device, which values are each predefined or agreed, and to enable an access device of the transportation vehicle only if a received radio signal from the mobile device has a corresponding identification feature having a latest value at that time. The locking apparatus is thus designed to perform the method described above.

Disclosed embodiments also include developments of the locking apparatus that have features that have already been described in connection with the developments of the disclosed method. Therefore, the corresponding developments of the locking apparatus are not described again here.

In the exemplary embodiment, the described components of the embodiment each constitute separate features to be considered independently of one another which develop in each case also independently of one another and hence can also be considered to be part of the disclosure individually or in a different combination from that shown. In addition, further features that have already been described can also be added to the described embodiment.

Functionally identical parts are denoted by the same reference signs in each of the figures.

FIG. 1 shows a radio-based locking apparatus 10 of a transportation vehicle 11. For a radio connection between a mobile device 12 and the locking apparatus 10, the mobile device 12 can transmit an electromagnetic radio signal 13 to a transceiver 14 of the transportation vehicle 11, or receive an electromagnetic radio signal 15 from the transceiver 14. For this purpose, the mobile device comprises a first data communication interface 16 and a second data communication interface 17, and the locking apparatus comprises a first data communication interface 18 and a second data communication interface 19. The radio signal 13 can be transmitted by the mobile device 12, for example, if an operation is performed on the transportation vehicle 11 (e.g., a door handle being touched, which can be detected by a contact sensor) or if it is detected that the mobile device 12 is approaching the transportation vehicle 11.

Figure 2:
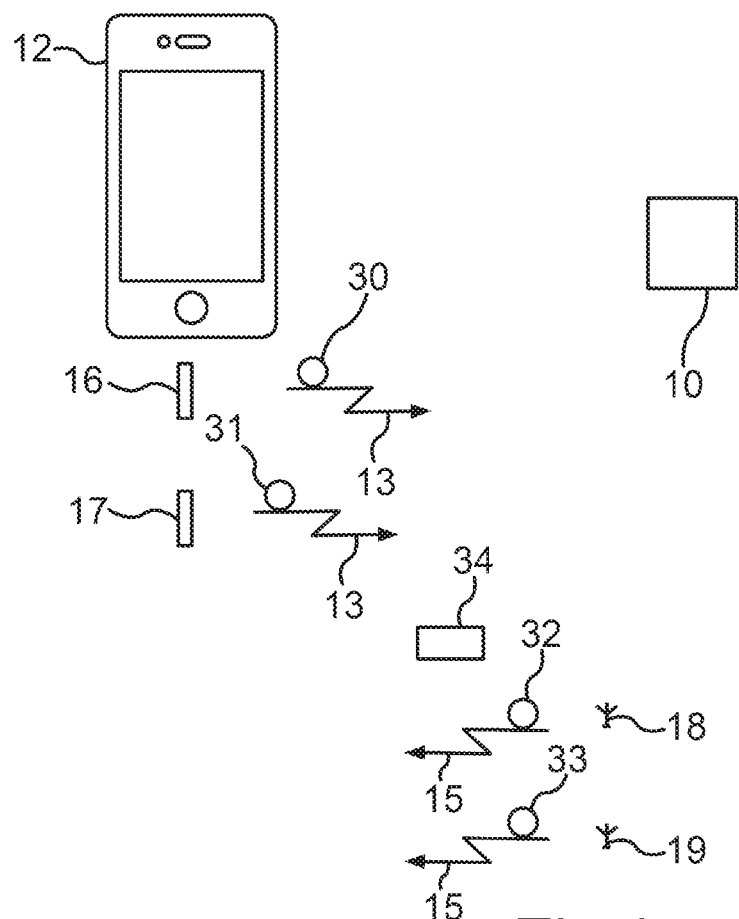
FIG. 2 is a schematic diagram of a possible implementation of the disclosed method.

FIG. 2 shows the mobile device 12 and the locking apparatus 10. The data communication interface 16 generates a radio signal 13 having an identification feature 30, the data communication interface 17 generates a radio signal 13 having an identification feature 31, the data communication interface 18 generates a radio signal 15 having an identification feature 32, and the data communication interface 19 generates a radio signal 15 having an identification feature 33. FIG. 2 also shows a predefined time length 34.

In an exemplary embodiment, the data communication interfaces 16 and 18 are both WLAN interfaces, and the data communication interfaces 17 and 19 are both BLUETOOTH® interfaces. In this case, the mobile device 12 is designed to be a passive radio key, so that a user can operate an access function of the transportation vehicle 11 without operating the mobile device 12 itself. To do this, the locking apparatus 10 transmits a first radio signal 15 having the identification feature 32 to the mobile device 12. The identification feature 32 is modified compared to an identification feature of a previous locking operation, i.e., in the described locking operation in the exemplary embodiment, the latest value is being used for the first time. The mobile device 12 knows the latest value of the identification feature 32 from a preceding encrypted radio signal from the transportation vehicle and can therefore identify and receive it. The identification feature 32 may be an IP address of the locking apparatus 10 or of the transportation vehicle 11. So that an access function of the transportation vehicle 11 can be enabled, the mobile device 12 transmits via the data communication interface 16 a radio signal 13 having an identification feature 30, the latest value of which is known to the locking apparatus 10 by the methods or mechanisms described above. Then the method is paused, for example, by a predefined time length 34, the predefined time length 34 being so short that a user of the transportation vehicle does not notice it. For instance, it is 100 ms for this purpose. Afterwards, a radio signal 15 having an identification feature 33 is transmitted to the mobile device 12 from the other data communication interface 19, which in this exemplary embodiment is not a WLAN interface but a BLUETOOTH® interface, wherein the mobile device 12 again knows the latest value of the identification feature 33. After the mobile device 12 has received this radio signal 15, it in turn transmits a response signal 13 to the locking apparatus 10, which response signal 13 has the identification feature 31, which is known to the locking apparatus 10. Only once all the signals having the associated identification features have been sent or received is the access function of the transportation vehicle enabled. This example shows how each radio connection, which has an associated radio signal 13, 15, in each case has a different identification feature 30, 31, 32, 33. A pause of a predefined time length 34 occurring during the method means that an unauthorized third-party cannot detect that the respective radio signals are associated radio signals of a locking operation of the locking apparatus 10. Enabling an access function of the transportation vehicle 11 is thereby secure from unauthorized third-parties because the third-parties cannot manipulate the respective signals. The described sequence of the radio connections or intervening pauses may be altered for each locking operation.

In another exemplary embodiment, the data communication interfaces 16 and 17 are both embodied as WLAN interfaces. In this case, the mobile device 12 is a radio key that transmits the radio signal 13 having the identification feature 30 to the locking apparatus 10. The locking apparatus 10 in this case knows the latest identification feature 30, or more precisely knows the latest value thereof. After transmitting the first radio signal 13, the mobile device 12 sends a second radio signal 13, which has an identification feature 31, to the locking apparatus 10. The locking apparatus 10 now knows the latest identification feature 31, or more precisely the latest value thereof, because this value has already been transmitted as encrypted information in the first radio signal 13, which has the identification feature 30, to the locking apparatus 10. Only once the second radio signal, which contains the identification feature 31, has also been successfully identified and received is an access function of the transportation vehicle enabled. The exemplary embodiment uses one communication interface by way of example to show how, in principle, it is also possible to make known currently latest values of an identification feature to a corresponding other component of the locking apparatus using different data communication interfaces and a plurality of radio signals 13, 15.

Disclosed embodiments provide a defense against range extensions or relay-station attacks for virtual keys in mobile devices comprising BLUETOOTH® and/or WLAN. Known defence options partly cannot be used in mobile devices because these devices provide only certain technologies as standard. In the method, communication between the mobile device and the transportation vehicle is distributed to a plurality of communication connections, i.e., data communication interfaces, in a predefined sequence, which is not known to an attacker, making an attack significantly more difficult. Radio standards that are present as standard in mobile phones are used for this purpose, resulting in a cost benefit. To defend against relay-station attacks, one, optionally more than one, data communication interface in the transportation vehicle, which interface communicates with the mobile device being used as a transportation vehicle key via one radio connection at a time, is modified in a predefined way unknown to an attacker, for instance, by modifying an identification feature and/or a physical signal property. This makes relay-station attacks at least significantly more difficult. As additional protection, data communication interfaces can also be used to determine a distance and/or position of the mobile device relative to the transportation vehicle. This is possible, for example, by a distance measurement by measurements of the receive field strengths, a phase measurement for determining the distance, a phase measurement for determining the angle, a transit-time measurement, triangulation of the distances and/or determining angles for locating the mobile device.

To summarize, the disclosed embodiment protects operation of a radio-based locking apparatus of a transportation vehicle from manipulation by using in each radio connection a modified identification feature that a third-party does not know and, by regular modification, cannot know, and hence the third-party cannot detect, and thus cannot extend in range, the relevant radio signal for enabling an access function of the transportation vehicle, nor generate a fake radio signal.

LIST OF REFERENCES locking apparatus (10)
transportation vehicle (11)
mobile device (12)
radio signal (13)
transceiver (14)
radio signal (15)
data communication interface (16)
data communication interface (17)
data communication interface (18)
data communication interface (19)
button (20)
identification feature (30)
identification feature (31)
identification feature (32)
identification feature (33)
time length (34)

The invention claimed is:

1. A passive radio-based locking apparatus for a transportation vehicle, the locking apparatus comprising:
    at least two radio interfaces, which set up at least two electromagnetic radio connections to a mobile device, which as a radio key unit enables at least one access function of a transportation vehicle containing the passive radio-based locking apparatus in a locking operation; and
    a controller enabling the access function only in response to an identification feature of the mobile device having a predefined value,
    wherein the predefined value is different for each radio connection, and in each case is known to the locking apparatus by an encrypted radio signal that the locking apparatus receives from the mobile device by a radio connection,
    wherein the controller brings about, during a locking operation, the at least two different data communication interfaces set up at least two different electromagnetic radio connections, and the at least two electromagnetic radio connections, which differ in terms of their identification feature, are made at different times in a predefined pattern and/or a different identification feature is used for each data communication interface.

2. The apparatus of claim 1, wherein a WLAN interface and/or a BLUETOOTH® interface of the mobile device and of the transportation vehicle are used in each case as the data communication interfaces.

3. The apparatus of claim 1, wherein the at least two radio connections are each successively set up in a predefined sequence via the at least two different data communication interfaces, or in addition simultaneously an additional data communication interface sets up a radio connection.

4. The apparatus of claim 1, wherein an IP address and/or a MAC address of the mobile device and/or of the transportation vehicle is used as the at least one identification feature of the at least one data communication interface.

5. The apparatus of claim 1, wherein the corresponding other component of the locking apparatus is informed of the modified identification feature by encrypted information in a radio signal or in an additional first radio signal of a current radio connection.

6. The apparatus of claim 1, wherein a transmit power and/or a transmit frequency and/or a receiver sensitivity are modified as additional modifiable parameters of the radio connection.

7. The apparatus of claim 1, wherein at least one component of the locking apparatus sets up via at least one data communication interface at least one additional electromagnetic radio connection, which is independent of the at least one radio connection of the locking apparatus.

8. The apparatus of claim 1, wherein at least one of the at least two data communication interfaces is also used to determine a distance and/or a position of the radio key unit with respect to the transportation vehicle by a receive field-strength measurement and/or a transit-time measurement and/or a phase measurement, and the access function is enabled only in response to the distance and/or the position each lying in a predefined range.

9. A method for operating a passive radio-based locking apparatus of a transportation vehicle, which locking apparatus is operated by two electromagnetic radio connections and is used to enable at least one access function of the transportation vehicle, wherein the passive radio-based locking apparatus comprises as components at least one mobile device embodied as a radio key unit, and at least two transceivers at the transportation vehicle, between which at least two electromagnetic radio signals are exchanged for the at least two electromagnetic radio connections, and for the operation, at least one parameter of the at least two radio connections of the locking apparatus is modified in a predefined way unknown to a third-party, wherein
    as the parameter, at least prior to enabling the access function, at least one identification feature of each of at least two different data communication interfaces for setting up communication for the radio connections, which are made successively, at the at least one radio key unit and/or at the at least one transceiver is modified and also each set to a latest value, and the access function is enabled only in response to the relevant identification feature having at least the latest value,
    wherein, during a locking operation, the at least two different data communication interfaces are used to set up at least two different electromagnetic radio connections, and the at least two electromagnetic radio connections, which differ in terms of their identification feature, are made at different times in a predefined pattern and/or a different identification feature is used for each data communication interface.

10. The method of claim 9, wherein a WLAN interface and/or a BLUETOOTH® interface of the mobile device and of the transportation vehicle are used in each case as the data communication interfaces.

11. The method of claim 9, wherein the at least two radio connections are each successively set up in a predefined sequence via the at least two different data communication interfaces, or in addition simultaneously an additional data communication interface sets up a radio connection.

12. The method of claim 9, wherein an IP address and/or a MAC address of the mobile device and/or of the transportation vehicle is used as the at least one identification feature of the at least one data communication interface.

13. The method of claim 9, wherein the corresponding other component of the locking apparatus is informed of the modified identification feature by encrypted information in a radio signal or in an additional first radio signal of a current radio connection.

14. The method of claim 9, wherein a transmit power and/or a transmit frequency and/or a receiver sensitivity are modified as additional modifiable parameters of the radio connection.

15. The method of claim 9, wherein at least one component of the locking apparatus sets up via at least one data communication interface at least one additional electromagnetic radio connection, which is independent of the at least one radio connection of the locking apparatus.

16. The method of claim 9, wherein at least one of the at least two data communication interfaces is also used to determine a distance and/or a position of the radio key unit with respect to the transportation vehicle by a receive field-strength measurement and/or a transit-time measurement and/or a phase measurement, and the access function is enabled only in response to the distance and/or the position each lying in a predefined range.

* * * * *